3,576,602
METHOD FOR MANUFACTURING DIAMOND
Tatsuo Kuratomi, Hamatake 4-chome 2–18,
Chigasaki-shi, Kanagawa-ken, Japan
No Drawing. Filed July 15, 1968, Ser. No. 744,682
Claims priority, application Japan, July 17, 1967,
42/45,602
Int. Cl. C01b 31/06
U.S. Cl. 23—209.1                                  3 Claims

ABSTRACT OF THE DISCLOSURE

Diamond is produced by subjecting to elevated temperatures and pressures a mixture of a non-diamond form of carbon, a solvent consisting of a carbide such as vanadium carbide and/or a carbide forming metal such as vanadium, and a catalyst or promoter selected from the group consisting of $\beta$-Ti, $\beta$-Zr, $\beta$-Hf, V, Nb, Cu and Be.

BACKGROUND OF THE INVENTION

The invention of the present application relates to a process for producing diamond synthetically.

The production of diamond synthetically has long been of great interest because of the scarcity of natural diamond and the many industrial and other uses therefor. Solvent processes have been used with more or less success since Moissan first disclosed the production of diamond by quenching a solution of carbon in molten iron. In prior art methods transition metals such as cobalt, nickel, iron, manganese and chromium which form somewhat unstable carbides have been employed as solvents for the carbon which is to be transformed into the diamond allotropic form.

SUMMARY OF THE INVENTION

According to the present invention both a solvent and a catalyst or promoter are used in the production of diamond, the solvent being a stable carbide, such as vanadium carbide, and the catalyst being one or more metals which promote the formation and crystallization of diamond, viz. titanium, zirconium, hafnium, vanadium, niobium, copper and beryllium. A mixture of carbon with one or more solvent carbides or metals forming such carbides under the conditions of the process and with one or more of the catalyst metals is subjected to high pressure and elevated temperature and diamond is recovered from the resulting compacted mass after cooling thereof.

DESCRIPTION OF THE PREFERRED EMBODIMENT

In the following example there is described a specific embodiment of the present invention.

Example

A mixture was prepared of 1000 mg. graphite, 600 mg. vanadium carbide and 120 mg. $\beta$-zirconium metal. The graphite was finely divided and of the grade used in nuclear reactors. The vanadium carbide was granular with an average particle size of about 1700 microns. The zirconium was a fine powder with an average particle size of about 3 microns. This mixture was subjected for 15 minutes to a temperature of 1650° C.–1700° C. while applying thereto a pressure of 65,000–70,000 atmospheres and was thereafter cooled. Upon removal of the surrounding matrix by chemical treatment 360 mg. of diamond was recovered.

It will be understood that instead of graphite, carbon black and other suitable non-diamond carbon materials may be employed.

Although vanadium carbide is preferred as a solvent material for the carbon similar metal carbides such as those of titanium, zirconium, hafnium and niobium may be used. These metals are all strong carbide formers and may if desired be employed as the metal itself rather than as the carbide in preparing the batch mix for forming diamond. In the presence of an excess of carbon the carbide of the metal or metals used will be formed during the heating process. If desired mixtures of the solvent carbides, and/or the carbide forming metals, may be used.

With respect to metals which may be used as catalysts or promoters in the formation and crystallization of diamond according to the process of this invention, i.e. $\beta$-Ti, $\beta$-Zr, $\beta$-Hf, V, Nb, Cu and Be, it will be understood that mixtures of these may be employed if desired. While at the temperatures used in carrying out the process the stable allotropic form of both titanium and zirconium is the $\beta$ form, the trnsformation of hafnium from the $\alpha$ form to the $\beta$ form takes place at about 1760° C. and it is therefore required that this metal, if used, be added as the $\beta$ form initially.

The temperatures and pressures that may be used in the manufacture of diamond according to the invention are those employed in other similar processes for the same purpose. Preferably the temperature is maintained between about 1650° C. and about 1700° C. and a pressure between about 65,000 atmospheres and about 70,000 atmospheres is used. However, the pressure may range as low as about 55,000 atmospheres and, where the equipment used permits, may exceed 70,000 atmospheres with the temperature ranging from about 1380° C. to about 2100° C. As is generally true with reactions carried out at elevated temperatures the higher the temperature employed the less time is required. The higher pressures will also tend to shorten the time necessary for forming diamond. However, as shown in the foregoing example, a time of no more than 15 minutes is feasible.

The process can be carried out in known apparatus, e.g. apparatus of the types disclosed in U.S. Pats. 2,941,248 and 2,941,252, granted June 21, 1960, to H. T. Hall and H. P. Bovenkirk, respectively.

The proportions of carbon, solvent metal and/or carbide, and catalyst employed in carrying out the present novel process may vary considerably. Of course, to produce diamond the carbon must be present in excess over that which will be required to form carbides with carbide-forming metals present. The ratio of solvent to catalyst is preferably about 100:20 by weight but the ratio may vary between 100:3 and 100:30. The ingredients of the batch mixture used are preferably granular or finely divided to permit greater homogeneity in the mixture thus increasing the efficiency of the process.

It will be understood that variations in the materials used in the batch mixture and processing conditions will affect the type of diamond produced. Thus the diamond resulting from the example set forth above is of the type regarded as suitable for making resin-bonded abrasive articles. Diamond types preferred for making metal-bonded abrasives and other types may be produced by suitable selection of materials and conditions.

I claim:
1. A process for producing diamond comprising (1) subjecting a mixture of (a) non-diamond carbon, (b) a vanadium carbide solvent, and (c) a $\beta$-Zr promoter to an elevated temperature and pressure sufficient to convert non-diamond carbon to diamond; (2) cooling the resultant product; and (3) separating diamond therefrom.

2. A process as set forth in claim 1 in which the pressure employed is between about 65,000 and about 70,000 atmospheres and the temperature employed is between about 1650° C. and about 1700° C.

3. A process as set forth in claim 1 in which the pressure employed is between about 55,000 atmospheres and about 70,000 atmospheres, and in which the temperature employed is between about 1380° C. and about 2100° C.

References Cited

UNITED STATES PATENTS

| | | | |
|---|---|---|---|
| 2,992,900 | 7/1961 | Bovenkirk | 23—209.1 |
| 3,442,615 | 5/1969 | Wakatsuki et al. | 23—209.1 |
| 3,442,616 | 5/1969 | Wakatsuki et al. | 23—209.1 |
| 3,457,043 | 7/1969 | Wakatsuki et al. | 23—209.1 |

EDWARD J. MEROS, Primary Examiner